US012578067B1

(12) United States Patent
Chen

(10) Patent No.: US 12,578,067 B1
(45) Date of Patent: Mar. 17, 2026

(54) LED MODULE LIGHTSTICK

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 19/308,426

(22) Filed: Aug. 25, 2025

(51) Int. Cl.

| | |
|---|---|
| ***F21S 2/00*** | (2016.01) |
| ***F21S 4/28*** | (2016.01) |
| ***F21V 19/00*** | (2006.01) |
| ***F21V 23/06*** | (2006.01) |
| *F21Y 115/10* | (2016.01) |

(52) U.S. Cl.
CPC ................. *F21S 2/005* (2013.01); *F21S 4/28* (2016.01); *F21V 19/0015* (2013.01); *F21V 23/06* (2013.01); *F21Y 2115/10* (2016.08)

(58) Field of Classification Search
CPC ......... F21S 2/005; F21S 4/28; F21V 19/0015; F21V 23/06
See application file for complete search history.

(56) References Cited

U.S. PATENT DOCUMENTS

| | | | | |
|---|---|---|---|---|
| 10,591,114 | B1 * | 3/2020 | Lassen | F21V 15/013 |
| 11,402,083 | B1 * | 8/2022 | Lu | F21K 9/272 |
| 11,435,070 | B1 * | 9/2022 | Chen | F21S 4/22 |
| 2018/0299082 | A1 * | 10/2018 | Li | F21V 15/01 |
| 2019/0309933 | A1 * | 10/2019 | Norton | F21V 21/088 |
| 2020/0088395 | A1 * | 3/2020 | Shi | F21S 8/03 |
| 2021/0116112 | A1 * | 4/2021 | Petrescu | F21V 19/0055 |
| 2021/0381660 | A1 * | 12/2021 | Zhang | F21K 9/272 |
| 2023/0053387 | A1 * | 2/2023 | Parker | F21V 17/104 |
| 2023/0072195 | A1 * | 3/2023 | Bartek | H01R 25/162 |
| 2023/0332754 | A1 * | 10/2023 | Chen | F21V 21/35 |
| 2025/0135328 | A1 * | 5/2025 | Webb | F21S 2/005 |
| 2026/0009508 | A1 * | 1/2026 | Smith | F21S 4/20 |

* cited by examiner

*Primary Examiner* — Christopher E Dunay
(74) *Attorney, Agent, or Firm* — Stuart M Goldstein

(57) ABSTRACT

An LED module lightstick has an elongated extruded strip with upper and lower slots extending the length of the strip. LED modules are located atop the strip, each of the modules having downwardly extending snap-fit arms which hug the sides of the strip. Threaded position pins extend from each module and into the slot for adjustably connecting the modules to the strip. End terminals are located at the distal ends of the strip. Each end terminal has a columnar support circumscribing an open space into which the distal ends of the strip are inserted. Threaded position pins extend through the columnar supports and into the slots, thereby connecting the end terminals to the strip. In this manner, the length of the light stick is adjustably controlled. An extension member is also available to provide additional lightstick length options.

10 Claims, 18 Drawing Sheets

LED MODULE LIGHTSTICK

FIELD OF THE INVENTION

The present invention relates to electrical LED lightsticks, and particularly to LED module lightsticks which are readily adaptable for use in a variety of LED light boxes and other similar lighting enclosures.

BACKGROUND OF THE INVENTION

Conventional LED retrofit lightsticks are typically manufactured in fixed lengths, similar to T8 or T12 fluorescent tubes, ranging from 1 to 10 feet. LED modules on these sticks are usually secured to an aluminum bar using screws or 3M adhesive tape, making on-site installation difficult and time-consuming. Such lightsticks are routinely a single length, so there is no means of adjusting their lengths. In addition, the LED modules which are mounted on lightsticks are fixed in position. As a result of these limitations, current lightsticks are severely limited in their versatility for different lighting applications.

SUMMARY OF THE INVENTION

It is thus the object of the present invention to provide an LED module lightstick which addresses the limitations and disadvantages of prior LED module lightsticks.

It is therefore an object of the present invention to provide an LED module lightstick which has field-adjustable length, allows for flexible module positioning, rapid on-site assembly, and reliable attachment without adhesives or screws.

These and other objects are accomplished by the present invention, an LED module lightstick having an elongated extruded strip with upper and lower slots extending the length of the strip. A plurality of LED modules are located atop the strip, each of the modules having downwardly extending snap-fit arms which hug the sides of the strip. Threaded position pins extend from each module and into the slot for adjustably connecting the modules to the strip. End terminals are located at the distal ends of the strip. Each end terminal has a columnar support circumscribing an open space into which the distal ends of the strip are inserted. Threaded position pins extend through the columnar supports and into the slots in the strip, thereby connecting the end terminals to the strip. In this manner, the length of the light stick is adjustably controlled. An extension member is also available for attachment between two strips to provide additional lightstick length options.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
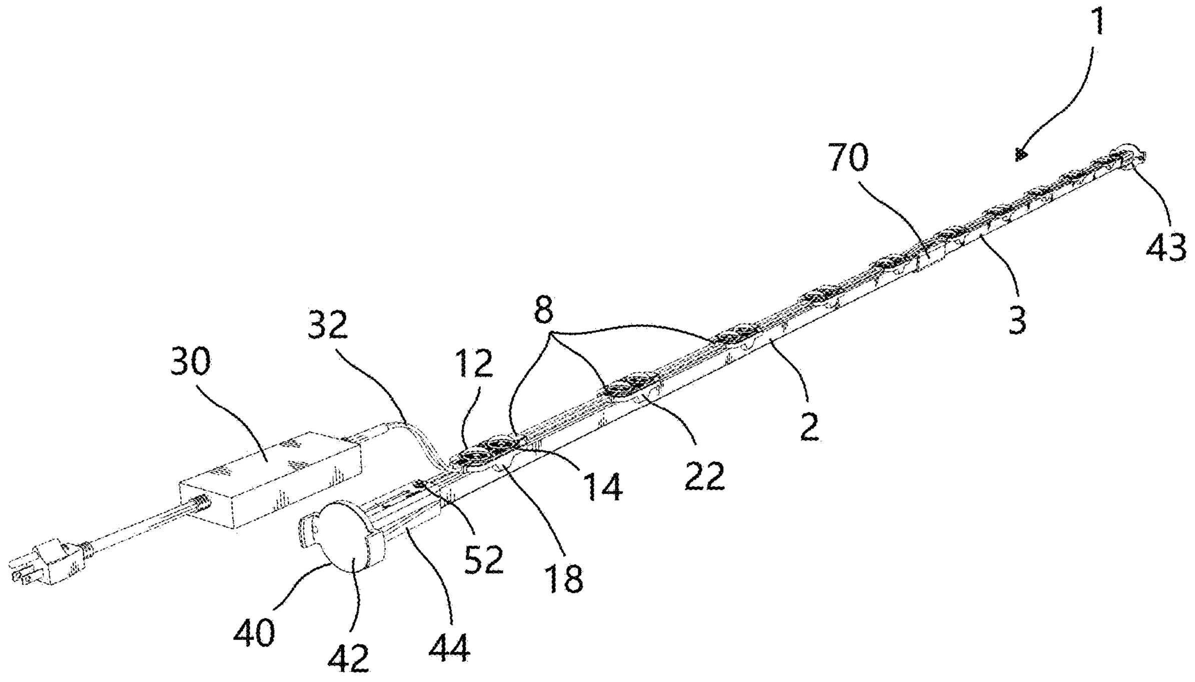
FIG. 1 is a perspective view of the lightstick of the present invention.

LED module lightstick 1 comprises elongated aluminum or like metal extrusion strip 2 having elongated upper slot 4 and lower slot 6, each slot extending the length of the strip 2. The strip is of a fixed length but can be easily cut to size. While lightstick 1 can comprise a single strip, it can be assembled with two or more strips. For instance, strips 2 and 3 can be interconnected by utilizing extension member 70 to increase length of lightstick 1, as will be more fully described hereinafter.

Figure 2:
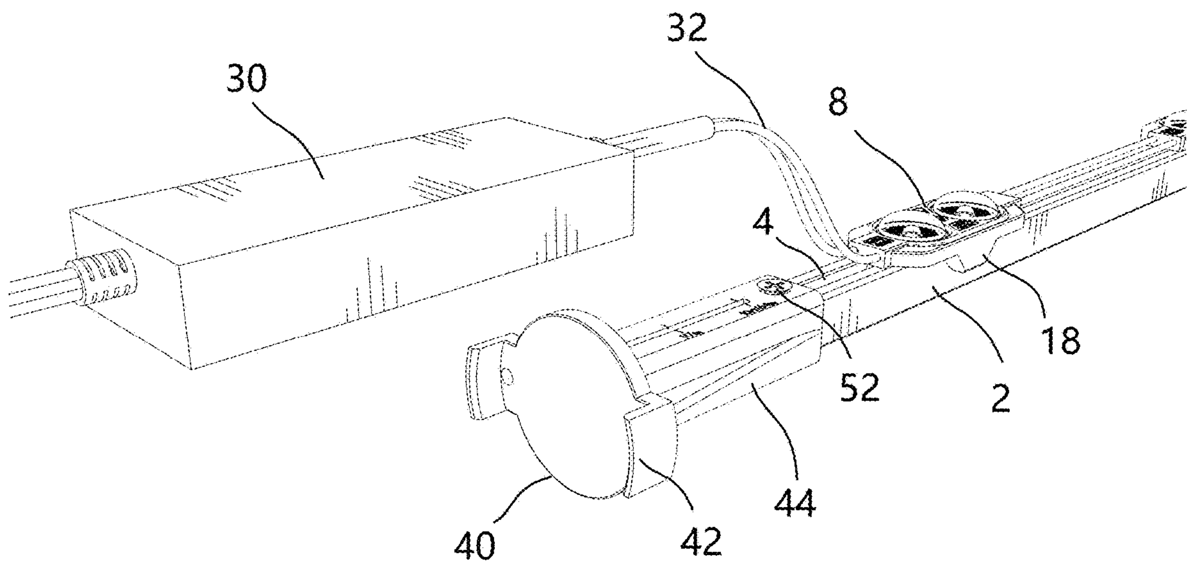
FIG. 2 is a close-up perspective view of one end of the lightstick of the present invention.
Figure 3:
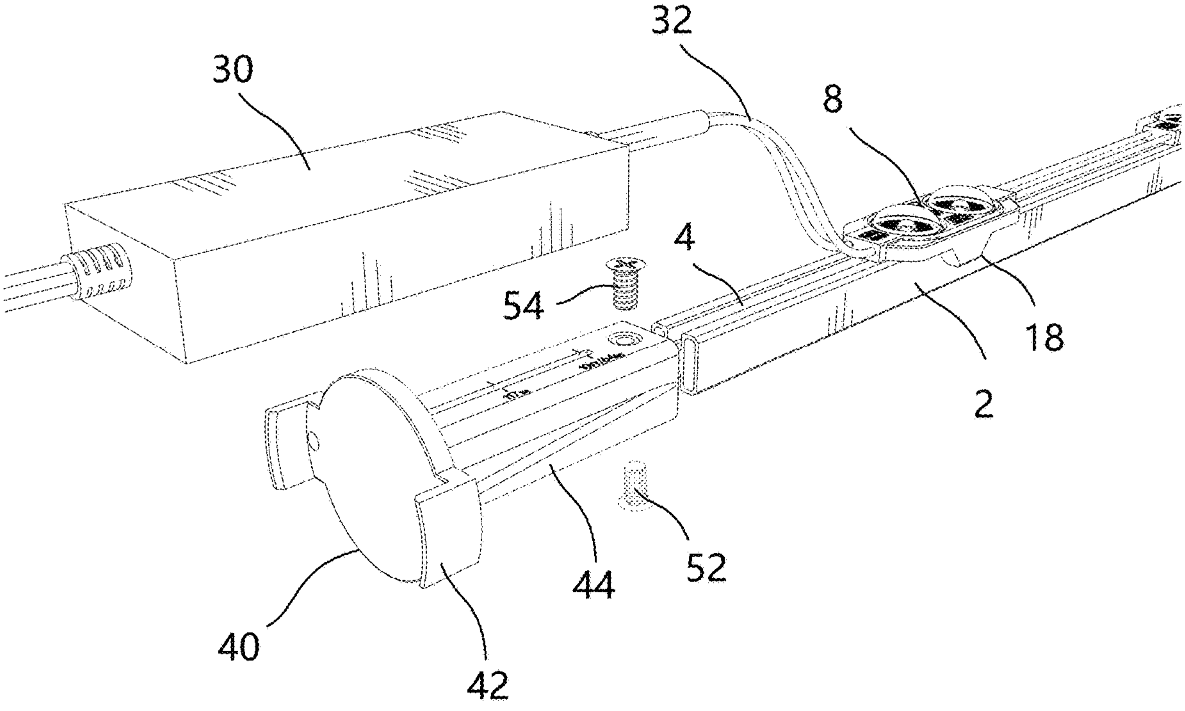
FIG. 3 is a close-up exploded perspective view of the components located at the one end of the lightstick of the present invention.
Figure 4:
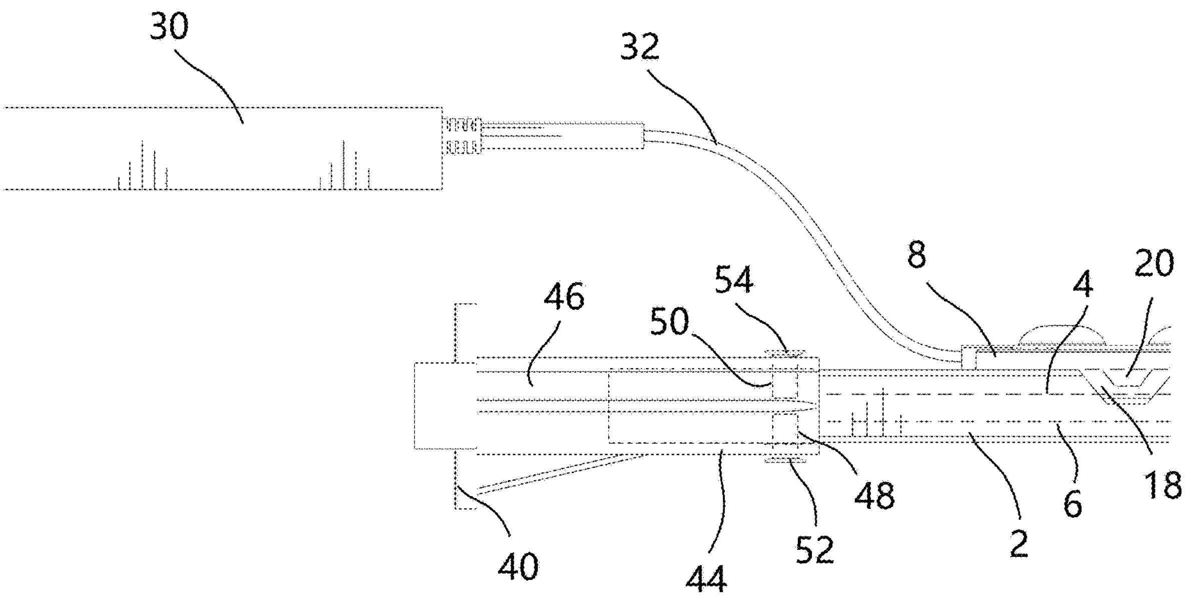
FIG. 4 is a close-up view elevation view of the one end of the lightstick of the present invention.
Figure 5:
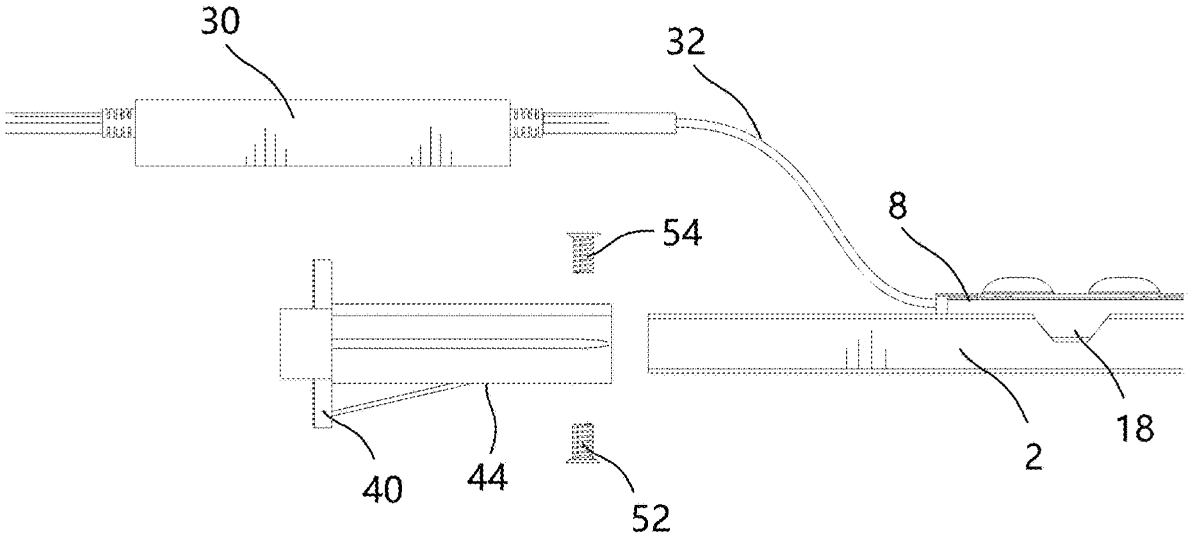
FIG. 5 is a close-up exploded elevation view of the components located at the one end of the lightstick of the present invention.
Figure 16:
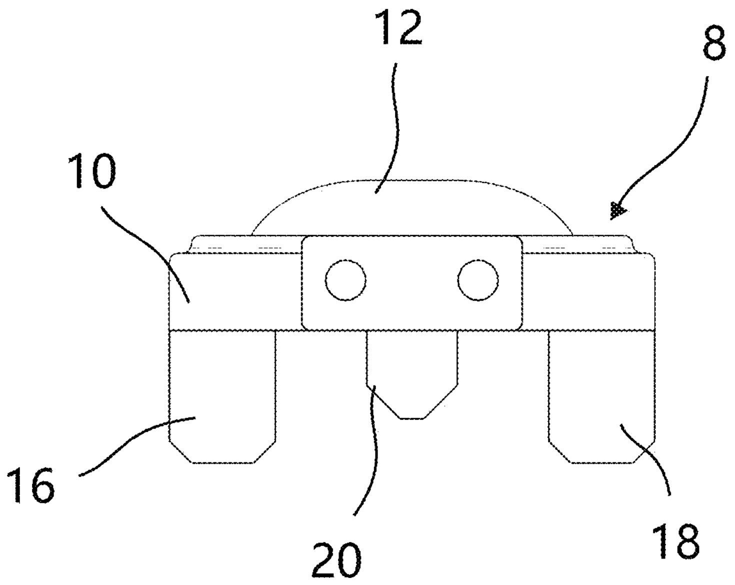
FIG. 16 is an end view of an LED module of the lightstick of the present invention.
Figure 17:
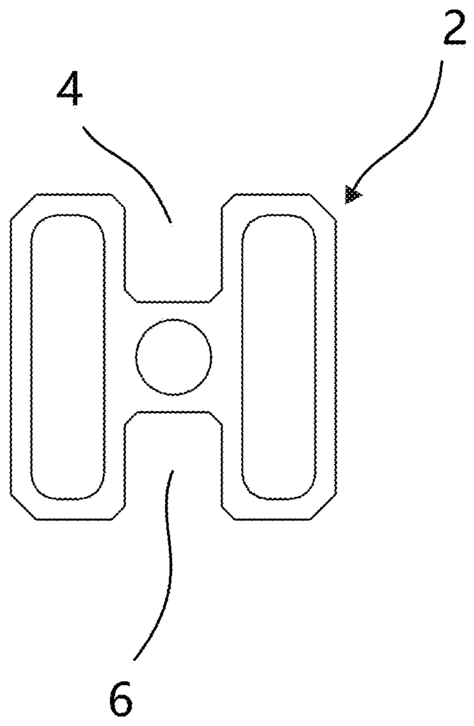
FIG. 17 is an end view of an extruded strip of the lightstick of the present invention.
Figure 18:
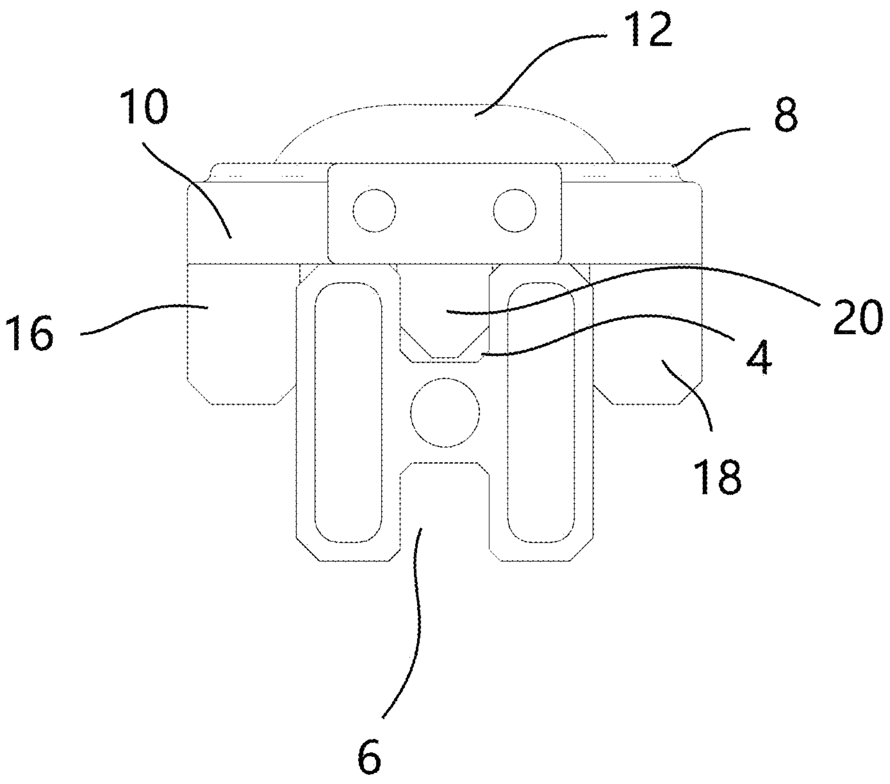
FIG. 18 is an end view of an LED module positioned a top and extruded strip of the lightstick of the present invention.

A plurality of LED modules 8 are positioned atop strip 2. As best seen in FIGS. 2 and 16, representative module 8 comprises base 10 and LED lights 12 and 14. Snap-fit lateral arms 16 and 18 of module 8 extend down from base 10 and wrap around to hug the sides of strip 2. Module 8 has position pin 20 which extends from the bottom of the module through to upper slot 4 in order to maintain the module in a fixed position within strip 2, and to provide alignment and tool-free, adhesive-free installation. By this connection system between modules 8 and strip 2, it is evident that the modules are readily adjustable to any variety of positions along the strip 2 simply by placing and securing position pin 20 and hence its module in different positions along the strip.

Power source 30 provides electricity, through electrical wiring 32, to module 8 and ultimately to the other modules positioned on strip 2, as is known in the art.

Terminal end 40 comprises base member 42 and columnar support 44 which circumscribes open space 46. Holes 48 and 50 extend through columnar support 44. These holes are configured to accept first attachment means in the form of threaded position pins 52 and 54.

Figure 6:
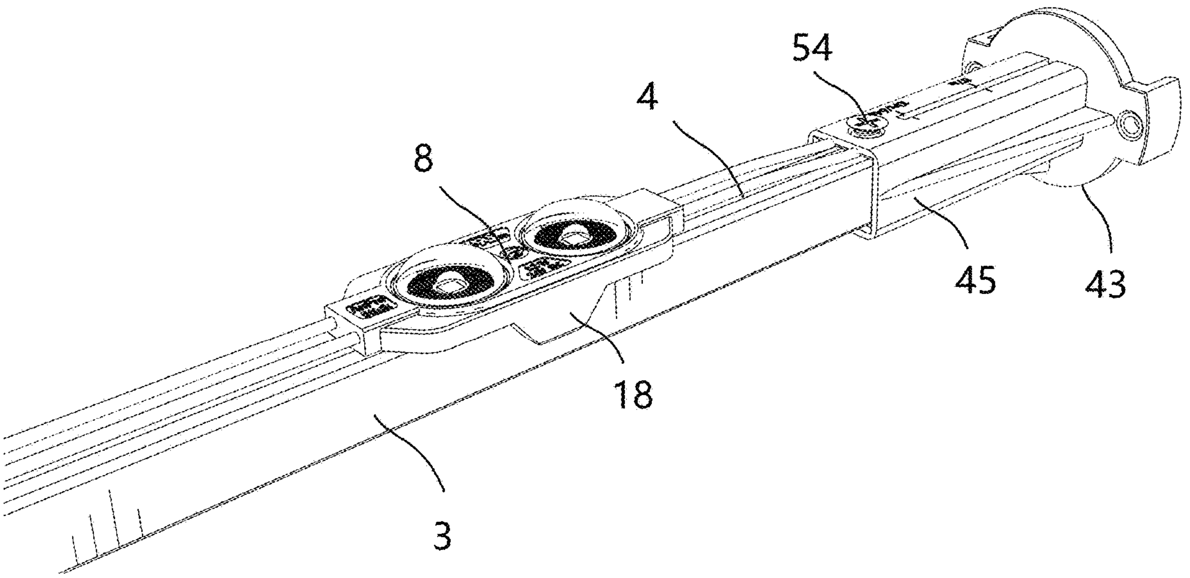
FIG. 6. is a close-up perspective view of the second or opposite end of the lightstick of the present invention.
Figure 7:
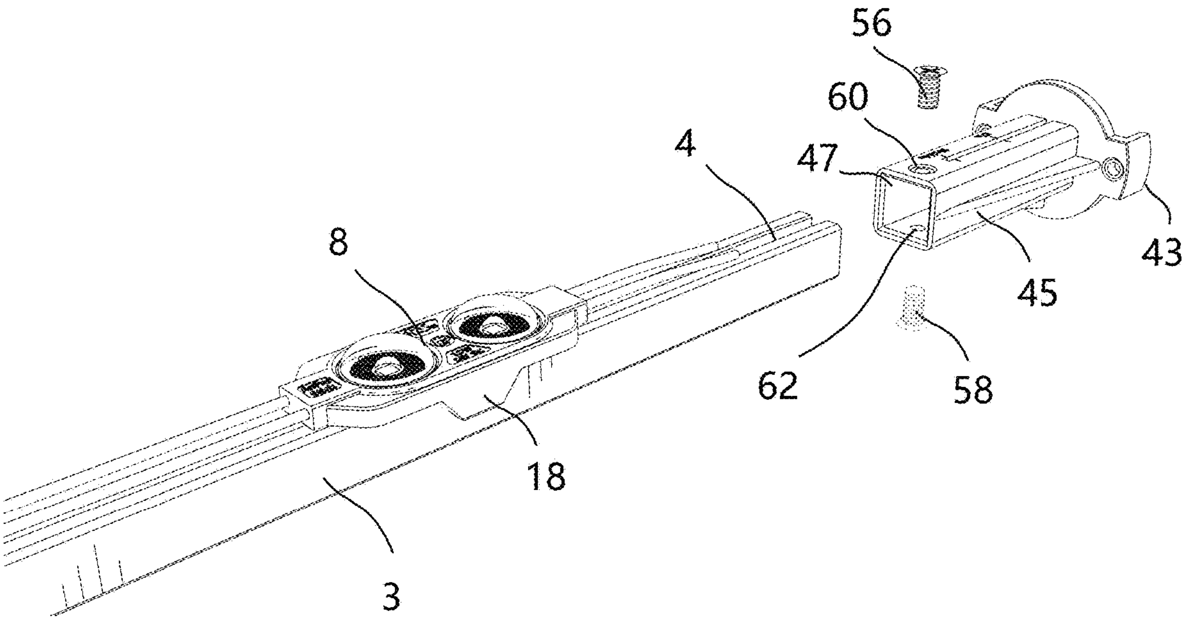
FIG. 7 is a close-up exploded perspective view of the components located at the second end of the lightstick of the present invention.
Figure 8:
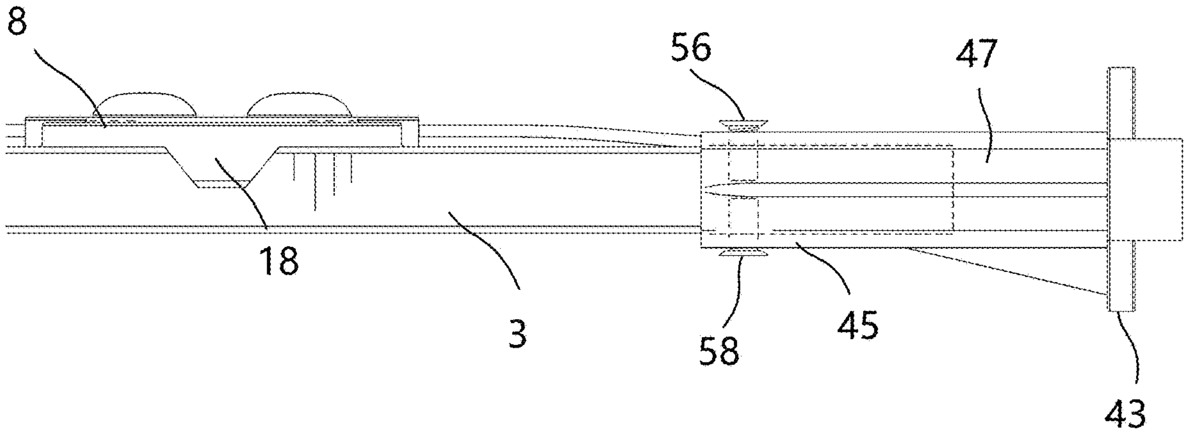
FIG. 8 is a close-up elevation view of the second end of the lightstick of the present invention.
Figure 9:
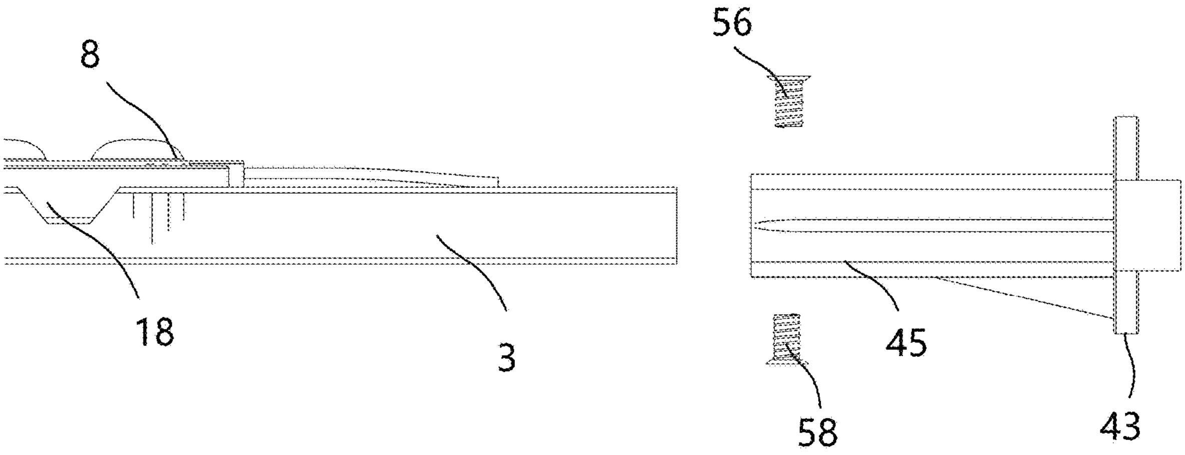
FIG. 9 is a close-up exploded elevation view of the components located at the second end of the light stick of the presentation.
Figure 10:
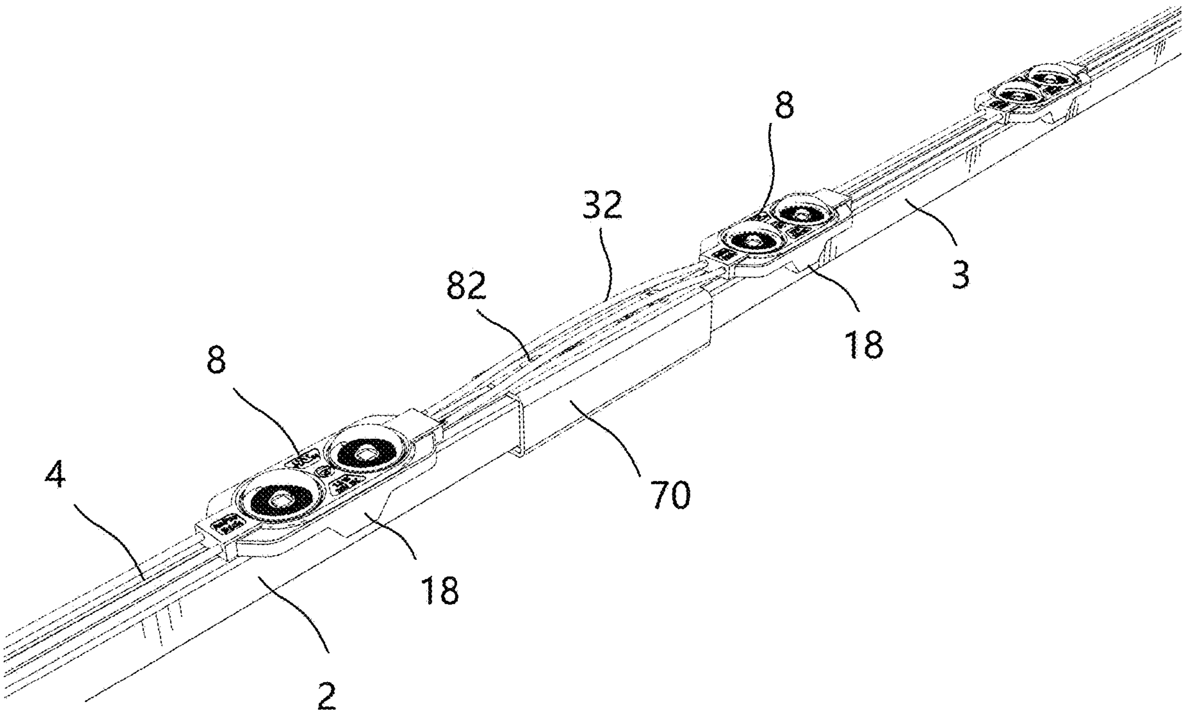
FIG. 10 is a close-up perspective view of the extension member used with two extruded strips of the lightstick of the present invention
Figure 11:
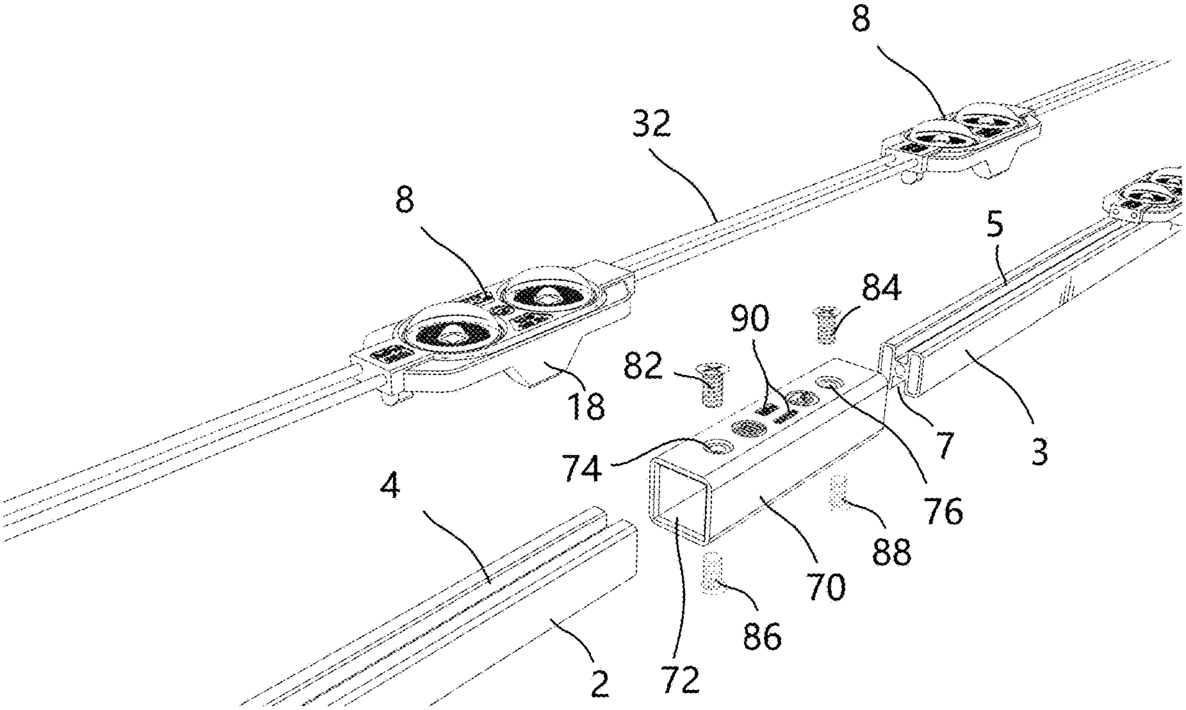
FIG. 11 is an exploded close-up perspective view illustrating the manner of attachment of the extension member to the extruded strips of the lightstick at the present invention.
Figure 12:
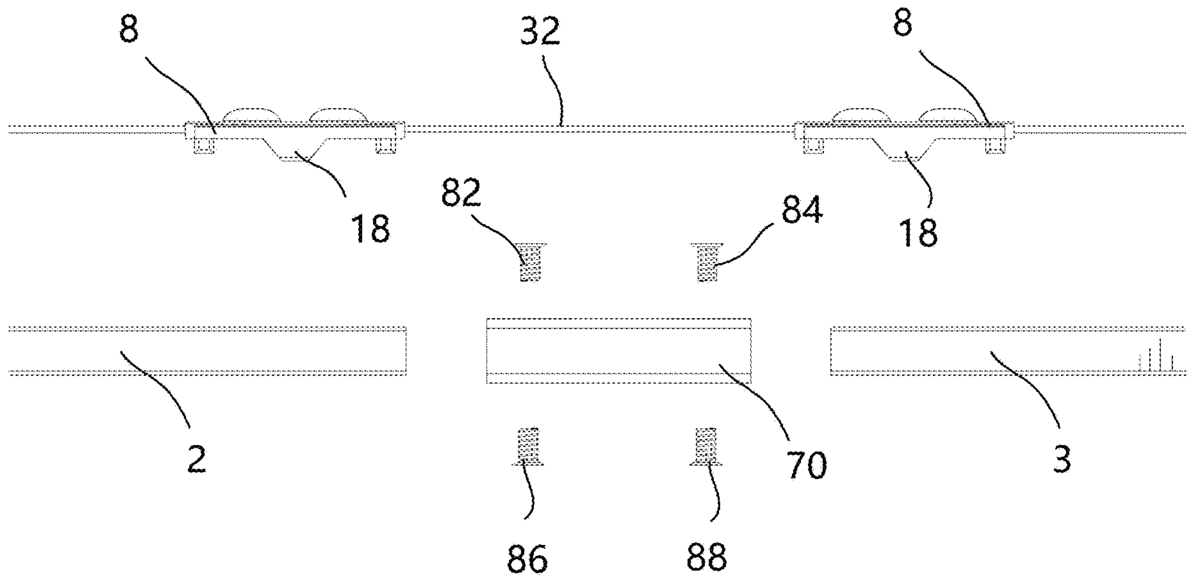
FIG. 12 is exploded close-up elevation view illustrating the manner of attachment of the extension member to the extruded strips of the lightstick of the present invention.
Figure 13:
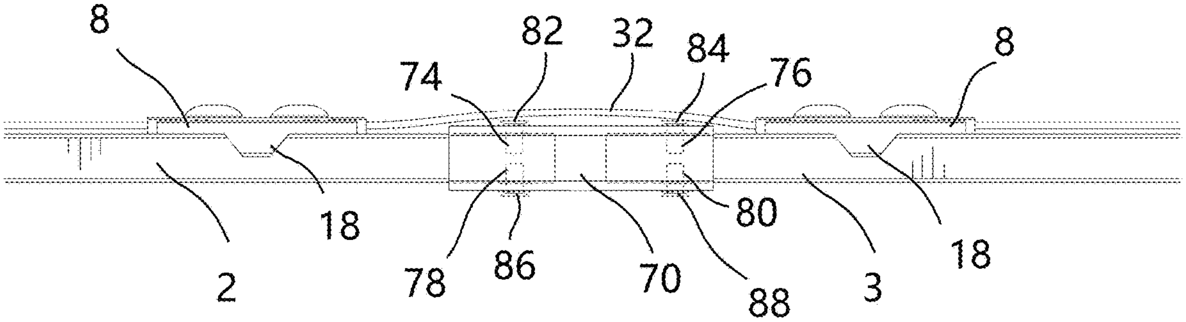
FIG. 13 is a close-up elevation view of the extension member attached to the extruded strips of the lightstick of the present invention.
Figure 14:
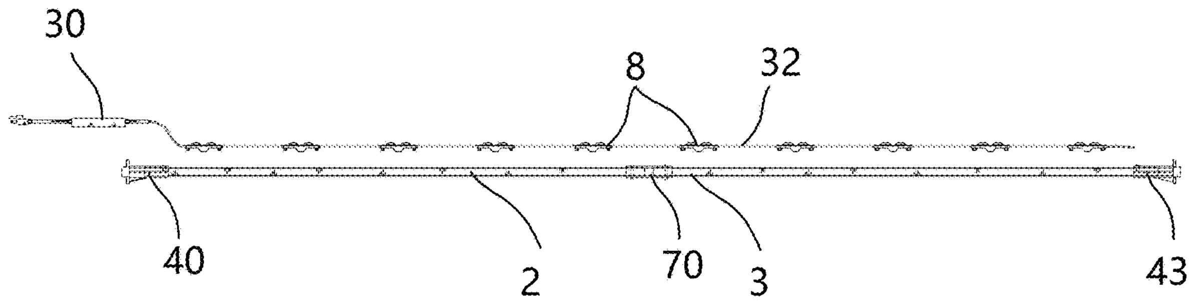
FIG. 14 is an elevation partially exploded view of the LED modules and electrical wiring, and their relationship to the extruded strips and extension member of the lightstick of the present invention.
Figure 15:
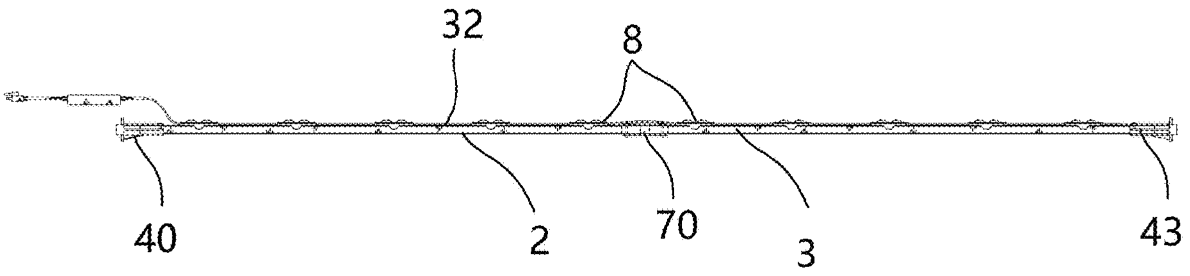
FIG. 15 is an elevation view of the lightstick of the present invention with its LED modules and wiring attached.

The components of LED module lightstick 1 are assembled by the insertion of strip 2 into columnar support 44. It can be appreciated that strip 2 can then be secured in this position by means of threaded pins 52 and 54 extending through holes 48 and 50, respectively, and then into upper slot 4 and lower slot 6, respectively. As best seen in FIG. 6, terminal end 43 with columnar support 45 can also be attached to the opposite end of lightstick 1 by the insertion of the end of the strip 3 into open space 47 of column support 45, which is connected therein by second attachment means in the form of threaded position pins 56 and 58 through holes 60 and 62 in slots 4 and 6, as previously described. In this manner, terminal ends 40 and 43 are adjustable in relation to strip 2 and 3 in order to vary the length of lightstick 1.

The length of lightstick 1 can also be extended and its length adjusted by means of extension member 70, positioned and connected between two lightstick strips, for example strips 2 and 3. Extension member 70 comprises open space 72 and holes 74, 76, 78, and 80, into which third attachment means in the form of threaded position pins 82, 84, 86, and 88 extend. As described with regard to previous strip connections, pins 82, 84, 86, and 88 are located within holes 74, 76, 78, and 80, respectively, the pins extending into upper slot 4 and lower slot 6 of strip 2 and upper slot 5 and lower slot 7 of strip 3. Extension member 70 also has provision for the insertion of an electrical attachment via plug openings 90.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An LED module lightstick comprising:

an elongated extruded strip having an internal slot extending the length of the strip;

a plurality of LED modules located atop of the strip, each of said modules having downwardly extending snap-fit arms which hug sides of the strip and a position pin extending from the bottom of the module into the internal slot for adjustably fixing the module in position on the strip;

an end terminal having a columnar support circumscribing an open space into which the strip is inserted; and first attachment means extending through the columnar support and into the slot for adjustably connecting the columnar support to the strip, wherein the end terminal is adjustable in relation to the strip to vary the length of the lightstick.

2. The LED module lightstick as in claim 1 wherein the end terminal is located at the end of the strip.

3. The LED module lightstick as in claim 1 comprising first and second end terminals, each end terminal having a columnar support circumscribing an open space, wherein an end of the strip is inserted into the open space of the columnar support of the first end terminal and the opposite end of the strip is inserted into the open space of the columnar support of the second end terminal such that the end terminals are adjustable in relation to the strip to vary the length of the lightstick.

4. The LED module lightstick as in claim 1 wherein the strip has an upper slot and a lower slot.

5. The LED module lightstick as in claim 4 wherein the first attachment means comprises threaded position pins extending from the columnar support into the upper and lower slots of the strip.

6. The LED module lightstick as in claim 5 further comprising second attachment means which comprises threaded position pins extending from the columnar support of the second terminal end into the upper and lower slots of the strip.

7. The LED module lightstick as in claim 4 further comprising second attachment means which comprise threaded position pins extending from the columnar support of the second terminal end into the upper and lower slots of the strip.

8. The LED module lightstick as in claim 1 further comprising two separate elongated extruded strips and an extension member circumscribing an open space, wherein ends of the two strips are inserted into the open space of the extension member to extend the length of the lightstick.

9. The LED module lightstick as in claim 8 further comprising third attachment means for connecting the extension member to the two strips.

10. The LED modular lightstick as in claim 9 wherein the third attachment means comprises threaded position pins which extend through openings in the extension member and into slots located in each of the two strips.

* * * * *